UNITED STATES PATENT OFFICE.

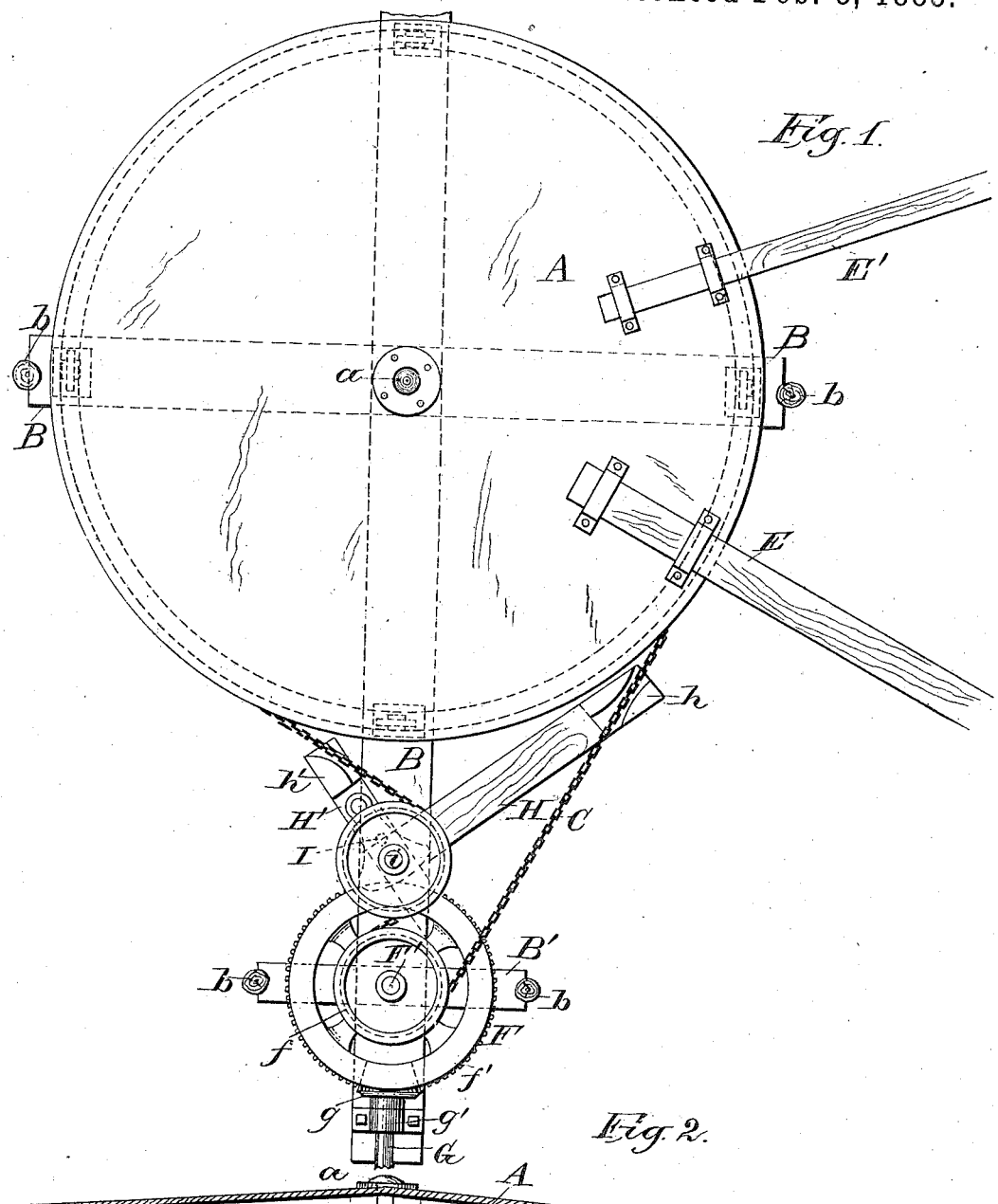

PETER FISHER, OF OAK CREEK, WISCONSIN.

HORSE-POWER MOTOR.

SPECIFICATION forming part of Letters Patent No. 311,737, dated February 3, 1885.

Application filed September 30, 1884. (No model.)

*To all whom it may concern:*

Be it known that I, PETER FISHER, of Oak Creek, in the county of Milwaukee, and in the State of Wisconsin, have invented certain new and useful Improvements in Horse-Power Motors; and I do hereby declare that the following is a full, clear, and exact description thereof.

My invention relates to improvements in horse-power motors, and will be fully described hereinafter.

In the drawings, Figure 1 is a top plan view of my improved device, and Fig. 2 a vertical section through the center of the same.

A indicates the driving-wheel of my motor, which is pivoted in the center of the cross-frame B on the pin $a$. The felly A' is supported a slight distance inward from the outer rim of the wheel, between the top and bottom framing of the same, the recess thus formed therein being designed to receive the driving-chair C; and in order to give to this latter a better grip around the wheel and prevent its tendency to slip, I may provide castings (not shown in the drawings) the outer edges of which are made of a shape to fit the chain-links, and which may be screwed at points about six inches apart around the felly. A strip or rail, $a'$, is fastened in the under side of the wheel A, close to its outer rim, and this strip bears evenly on the rollers D D, that are mounted in the path of the driving-wheel in the brackets $d\ d$, fastened to the arms of the cross-frame B.

E is the draft-pole, to which the horses are hitched, and E' is the guiding-pole. The long arm of the cross-frame B forms with the bar P' another but smaller cross, and in the center of this cross and on the bolt F' is pivoted the power-transmitting gear F. This gear has in its top the grooved chain-wheel $f$, around which the driving-chain C is carried, and below the said wheel $f$ and integral with or suitably fastened onto it is the bevel-cogged wheel $f'$. This latter meshes with the bevel-pinion $g$, fastened on the inner end of the driving-shaft G, which is journaled in the bearing-box $g'$, bolted onto and near the outer end of the cross-frame. This frame is maintained in place on the ground in the usual manner, as shown at $b\ b$.

About midway between the center of the gear F and the outer rim of the driving-wheel A, I fasten the bars H H', each of which carries on its end a grooved plate, $h\ h'$, wherein the chain C is guided toward the felly of the driving-wheel. At the point of junction of the bars H H' an idler, I, suitably grooved to receive the drive chain, is pivoted on the bolt $i$ in line with the center of the power-transmitting gear F, so as to bring the said chain in closer contact with the grooved rim of the wheel $f$, and give it a tighter grip around the same.

In order to prevent any damage resulting from exposure of the master-wheel to the weather, the top framing of the said wheel is made in the shape of a low cone, this arrangement permitting of the rain-water readily flowing down toward the rim and off.

Having thus described my invention, what I claim as new, and desire to secure by Letters Patent, is—

In a horse-power motor, the combination of the master-wheel A, pivoting-pin $a$, draft-pole E, guide-pole E', cross-frame B B', brackets $d\ d$, rollers D D, chain C, transmitting-gear F, with grooved pinion $f$ and bevel-wheel $f'$, bars H H', with guiding-plates $h\ h'$, idler I, pivoting-pin $i$, bevel-pinion $g$, bearing-box $g'$, and shaft G, substantially as shown and described, and for the purpose set forth.

In testimony that I claim the foregoing I have hereunto set my hand, at Milwaukee, in the county of Milwaukee and State of Wisconsin, in the presence of two witnesses.

PETER FISHER.

Witnesses:
HAROLD G. UNDERWOOD,
HERMAN J. FORSYTHE.